United States Patent [19]

Wolf

[11] 4,121,405
[45] Oct. 24, 1978

[54] GRASS-CUTTING AND AIR-IMPELLING MEANS FOR A ROTARY SCYTHE LAWN MOWER

[76] Inventor: Elmar Wolf, Au Wormberg, Wissembourg (Bas-Rhin), France

[21] Appl. No.: 743,669

[22] Filed: Nov. 22, 1976

[30] Foreign Application Priority Data

Dec. 22, 1975 [FR] France .................................. 75 40182

[51] Int. Cl.² ........................................... A01D 55/18
[52] U.S. Cl. ..................................... 56/12.9; 56/13.4; 56/295
[58] Field of Search ............. 56/13.4, 295, 503, 320.2, 56/255, 202, 12.9

[56] References Cited

U.S. PATENT DOCUMENTS

| 2,777,270 | 1/1957 | Colclazier | 56/13.4 |
| 2,779,146 | 1/1957 | Mitchell et al. | 56/13.4 |
| 2,796,714 | 6/1957 | Denney | 56/12.9 |
| 2,888,796 | 6/1959 | Denney | 56/13.4 |
| 3,690,051 | 9/1972 | Wood | 56/295 |
| 3,905,181 | 9/1975 | Messner | 56/13.4 |

Primary Examiner—Jay N. Eskovitz
Attorney, Agent, or Firm—Young & Thompson

[57] ABSTRACT

The disclosure is of a grass-cutting and air-impelling means for a rotary scythe lawn mower comprising at least one rotary cutter body below a coaxial disc furnished with upstanding radial vanes and air suction slots or openings immediately at the rear of the vanes.

3 Claims, 2 Drawing Figures

GRASS-CUTTING AND AIR-IMPELLING MEANS FOR A ROTARY SCYTHE LAWN MOWER

INTRODUCTION AND BACKGROUND OF THE INVENTION

The present invention relates more generally to the manufacture of lawn mowers, more particularly to grass-cutting and air-impelling means for rotary scythe lawn mowers.

In the known lawn mowers of this type the cutting tool is often in the form of an elongated cutter body which rotates about a central vertical axis inside a hood or cover of the mower. This cutter body has on the one hand the function of cutting the grass, and on the other hand the function of impelling the grass clippings to a wire basket or other receptacle by virtue of a current of air which ensures a good propulsion of the clippings to the basket or the like and which also raises the recumbent grass in such a manner that it can be cut by the cutting means or blades. This current of air is usually obtained by windage from the rotating blades.

However, during the rotation of the cutter body it produces a current of air with great turbulence which gives rise to a noise of which the level may be greater than the noise of the motor.

One object of the invention is to mitigate this disadvantage.

Another object of the invention is to provide efficient air-impelling means which can be economically manufactured and easily installed in a rotary scythe mower.

BRIEF SUMMARY OF THE INVENTION

According to the invention there is provided, for use in rotary scythe lawn mower, means for cutting grass and impelling air for raising grass and transporting grass clippings, said means comprising at least one rotary cutter body, a disc spaced above said cutter body, and a common shaft carrying said disc and said cutter body for rotation in unison about a substantially vertical axis, said disc being furnished with a plurality of upstanding substantially vertical vanes which extent substantially radially with respect to said vertical axis, said disc being furnished also with a plurality of suction openings each of which is placed adjacent to and at the rear (having regard to the direction of rotation) of a respective one of said vanes.

FURTHER DESCRIPTION AND ADVANTAGES OF THE INVENTION

The suction openings are preferably in the form of rectangular slots which are open at the periphery of the disc, the width of the slots being equal to or a little less than the width of the vanes, and the length of the slots being equal to approximately three-quarters of the length of the vanes, the latter extending from the periphery of the disc for about half of the radius of the disc.

How the invention may be put into practice will be readily appreciated from the following description and the accompanying drawing, given by way of non-limitative example.

BRIEF DESCRIPTION OF THE VIEWS IN THE DRAWING

In the said drawing, which is partly schematic

FIG. 1 is a lateral elevation of a preferred means in conformity with the invention, and FIG. 2 is a plan view corresponding to FIG. 1.

DETAILED DESCRIPTION OF THE PREFERRED EMBODIMENT

Figure 1:
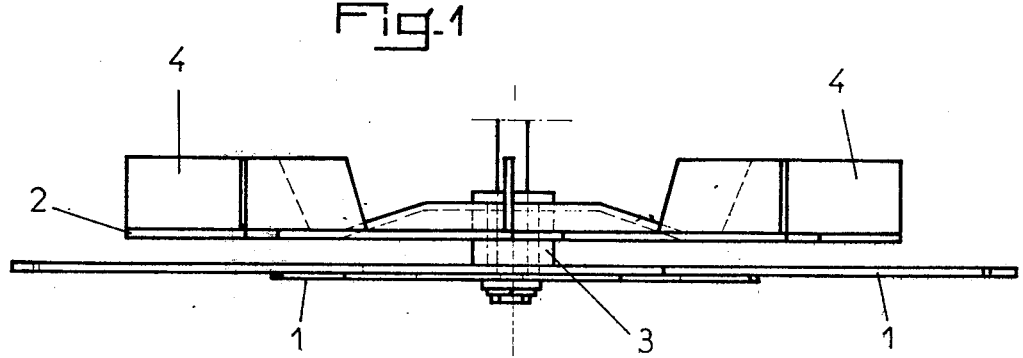
Figure 2:
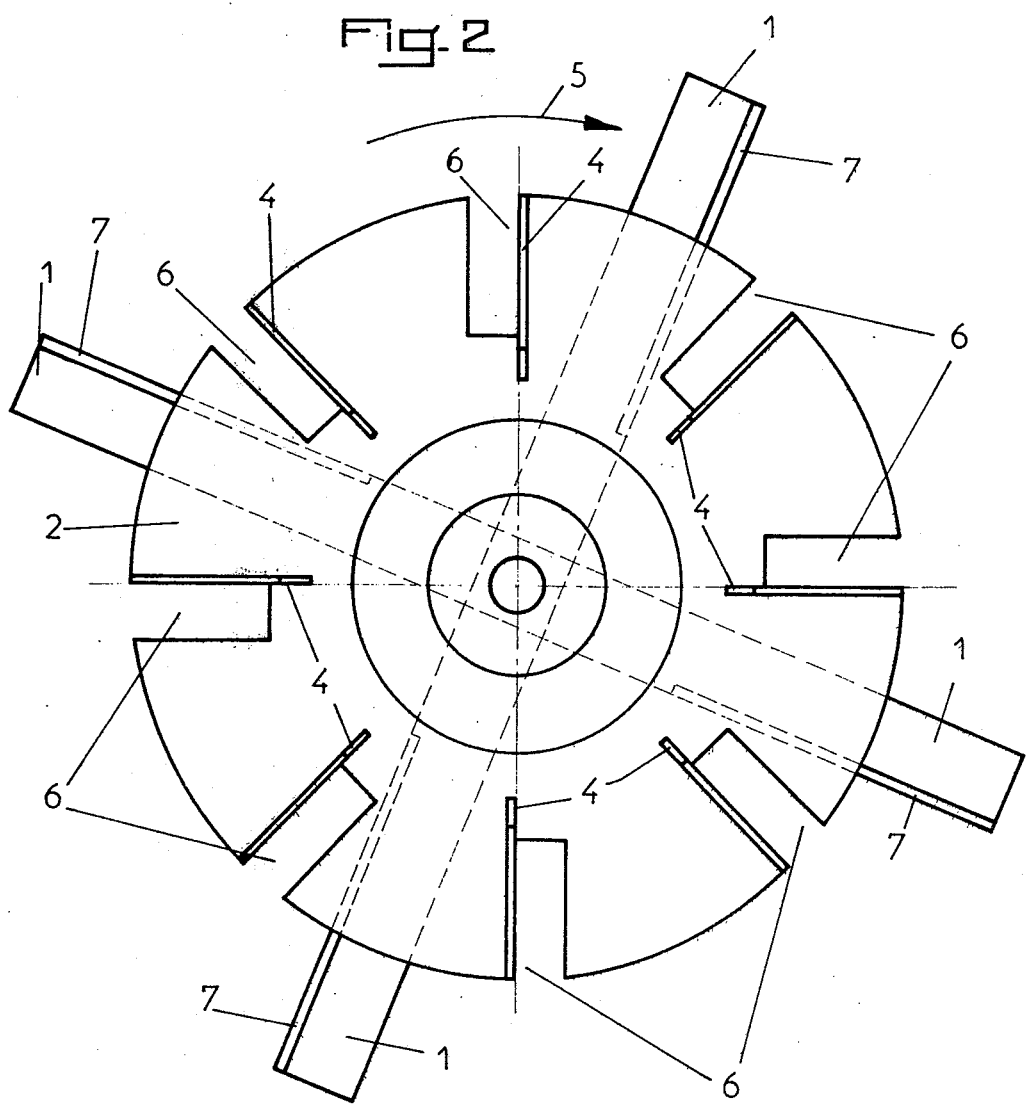

In conformity with the invention, and as illustrated by way of non-limitative example in FIGS. 1 and 2 of the accompanying drawing there is provided for use in a rotary scythe lawn mower a means for cutting grass and impelling air, said means comprising one or more rotary cutter bodies 1 and a disc 2 which is spaced above the cutter bodies 1 by means of a spacing collar 3 upon a common shaft on which the cutter bodies 1 and disc 2 are mounted for rotation in unison about a substantially vertical axis.

The disc 2 is furnished with vanes 4 which project vertically upwards from the upper surface of the disc 2 and are disposed radially with respect to the axis of rotation and are regularly spaced and are preferably eight in number. Immediately at the rear (having regard to the direction of rotation indicated by the arrow 5) of each vane 4 is a suction opening 6.

The two cutter bodies 1 are disposed at right angles to each other and have cutting edges 7 behind which the bodies 1 are flat and horizontal in such a manner as to provoke little air turbulence. These cutter bodies 1, however, may equally well present a slight upward inclination.

In the illustrated embodiment the suction openings 6 are in the form of rectangular slots which are open at the periphery of the disc 2, the width of the slots being equal to or a little less than the width of the vanes 4 which are also substantially rectangular with oblique inner ends. The length of the opening 6 is equal to approximately three-quarters of the length of the vanes 4, the latter extending from the periphery of the disc 2 for a distance equal to about one-half of the radius of the disc 2.

The means in accordance with the invention may equally well comprise only a single cutter body, for example when driven by a motor at a high speed of rotation, whereas two cutter bodies are preferable when driven at a comparatively low speed of rotation.

The disc 2 serves, on the one hand, to establish the current of air necessary for the propulsion of the grass clippings into a wire basket or other collecting receptacle, and, on the other hand, by virtue of the suction openings 6, which are immediately at the rear of the respective vertical vanes 4 considered with regard to the direction of rotation indicated by the arrow 5, to create a suction effect which causes the raising of recumbent grass to be cut in such a manner that the cutting edges 7 serve to cut the grass effectively. It is to be noted that the cutting edges 7 are slightly offset with respect to the suction openings 6.

Due to the radial positioning of the vertical vanes 4 they do not produce an undesirable current of air which operates disadvantageously from the point of view of the quality of the cutting and of the production of unpleasant noises during operation.

The cutter bodies 1 and the disc 2 are preferably mounted upon the shaft of the motor by means of a clutch, which may for example disengage automatically upon overload.

In the case of utilisation of the mower without a basket or other collecting receptacle for the grass clippings, for example when cutting tall grass in a meadow or the like, it is of course possible to remove the disc 2 and to work only with a pair of cutter bodies or a single cutter body.

By virtue of the invention it is possible to construct a device which, while permitting good cutting of the grass and effective collection of the grass clippings in a basket, develops a current of air without undue turbulence, that is to say without generating excessive noise.

It will be understood that the invention is not limited to the device as described with reference to and illustrated in the accompanying drawing, but various modifications are possible within the scope of the invention as defined in the following claims. For example, instead of being formed with cutting edges 7, the cutter bodies 1 could be provided with blade elements, which could be detachable or pivotally mounted.

What is claimed is:

1. For use in a rotary scythe lawn mower, means for cutting grass and impelling air for raising grass and transporting grass clippings, said means comprising at least one rotary cutter body having a cutting edge, a disc spaced above said cutter body, and a common shaft carrying said disc and said cutter body for rotation in unison about a substantially vertical axis, said disc having a plurality of upstanding substantially vertical vanes which extend substantially radially with respect to said vertical axis, said disc having also a plurality of suction openings each of which is disposed adjacent to and at the rear, having regard to the direction of rotation, of a respective one of said vanes, said suction openings being in the form of radially elongated slots which open through the periphery of the disc, said disc having a diameter substantially less than the diameter of said cutter body, the width of said vanes being at least as great as the width of said slots, the radial location of at least a portion of said suction openings in respect to the cutter body being between the outermost and innermost ends of the cutting edge to thereby overlie the cutting path of said cutter body.

2. Apparatus as claimed in claim 1, said vanes being substantially rectangular and extending from the periphery of said disc for about one-half of the radius of said disc, the length of said slots being equal to about three-quarters of the length of said vanes.

3. Apparatus as claimed in claim 1, said disc being of sheet metal and the central portion of said disc having the form of a downwardly opening truncated cone.

* * * * *